US012670538B2

(12) United States Patent
Aoki

(10) Patent No.: US 12,670,538 B2
(45) Date of Patent: Jun. 30, 2026

(54) FRAME RENDERING TIMING CONTROL

(71) Applicant: Sony Interactive Entertainment Inc., Tokyo (JP)

(72) Inventor: Sachiyo Aoki, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 56 days.

(21) Appl. No.: 18/429,487

(22) Filed: Feb. 1, 2024

(65) Prior Publication Data

US 2024/0289913 A1     Aug. 29, 2024

(30) Foreign Application Priority Data

Feb. 28, 2023     (JP) ................................. 2023-029769

(51) Int. Cl.
| | |
|---|---|
| *G06T 1/20* | (2006.01) |
| *A63F 13/63* | (2014.01) |
| *G06T 1/60* | (2006.01) |

(52) U.S. Cl.
CPC ............... *G06T 1/20* (2013.01); *A63F 13/63* (2014.09); *G06T 1/60* (2013.01)

(58) Field of Classification Search
CPC ... G06T 1/20; G06T 1/60; G09G 5/39; G09G 5/393; A63F 13/52; A63F 13/63; A63F 2300/203
USPC ................................................. 345/501, 545
See application file for complete search history.

(56) References Cited

U.S. PATENT DOCUMENTS

| | | | | |
|---|---|---|---|---|
| 7,256,788 B1 * | 8/2007 | Luu | ....................... | G06F 1/3243 |
| | | | | 713/340 |
| 9,915,996 B2 * | 3/2018 | Noro | ..................... | G06F 1/3228 |
| 2016/0150130 A1 * | 5/2016 | Noro | ......................... | G06F 3/14 |
| | | | | 348/516 |
| 2019/0206367 A1 * | 7/2019 | Kim | ...................... | H04M 1/725 |

FOREIGN PATENT DOCUMENTS

| | | |
|---|---|---|
| JP | 2008513890 A | 5/2008 |
| JP | 2009110536 A | 5/2009 |
| JP | 2015108745 A | 6/2015 |

OTHER PUBLICATIONS

Office Action issued on Feb. 4, 2025 in corresponding Japanese Patent Application No. 2023-029769 (8 pages; with English machine translation).
JP2023-029769, "Notice of Decision to Grant," May 20, 2025, 3 pages.

* cited by examiner

*Primary Examiner* — Jacinta M Crawford
(74) *Attorney, Agent, or Firm* — Kilpatrick Townsend & Stockton LLP

(57)     ABSTRACT

Provided is an information processing apparatus including a processor, the information processing apparatus drawing and buffering images frame by frame and outputting the buffered frame every predetermined timing, in which the processor performs a standby process of keeping a frame drawing process on standby until a specified timing, and starts and controls the performance of the frame drawing process after the standby process.

19 Claims, 7 Drawing Sheets

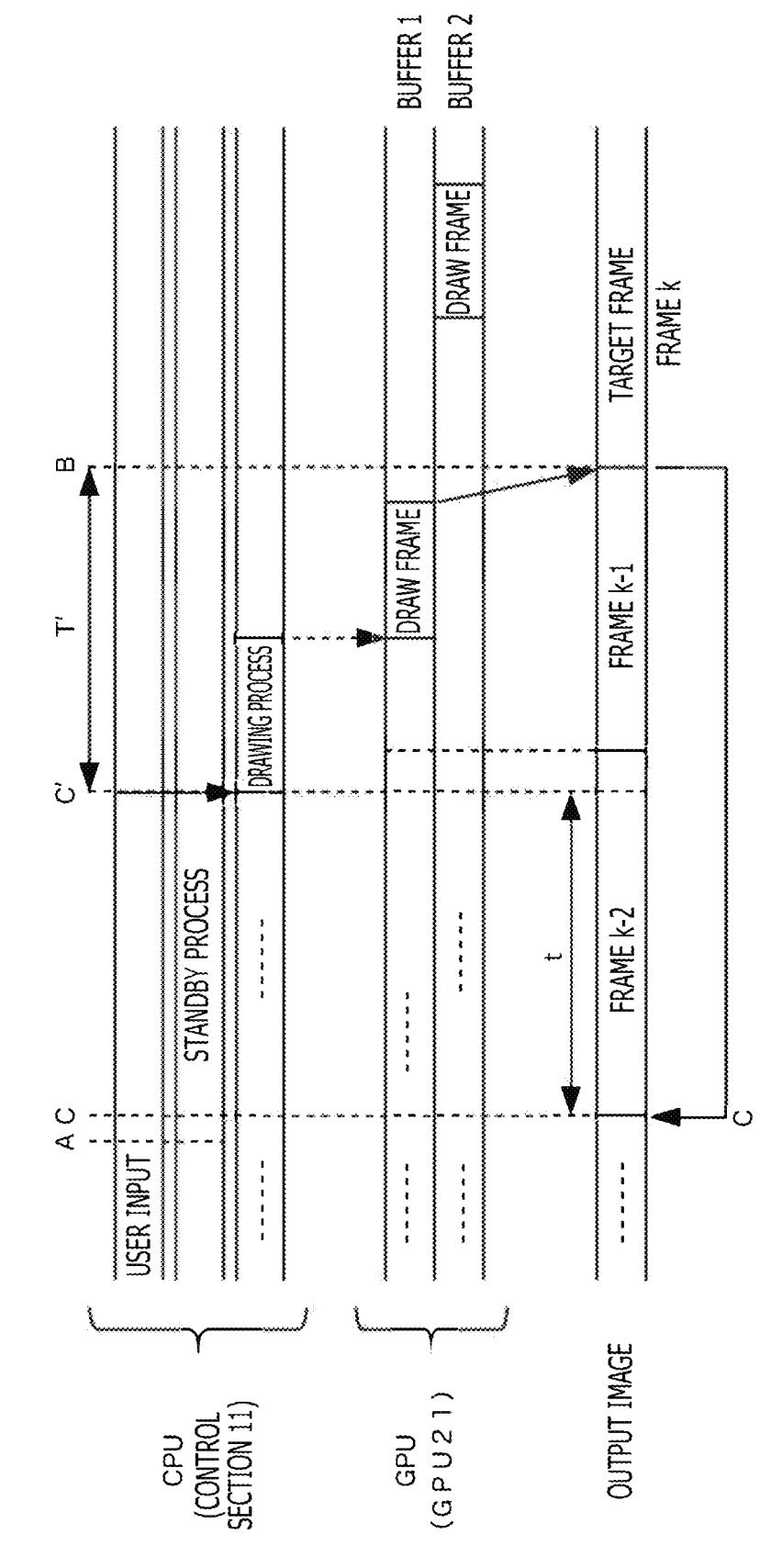
F I G . 3

FIG. 4

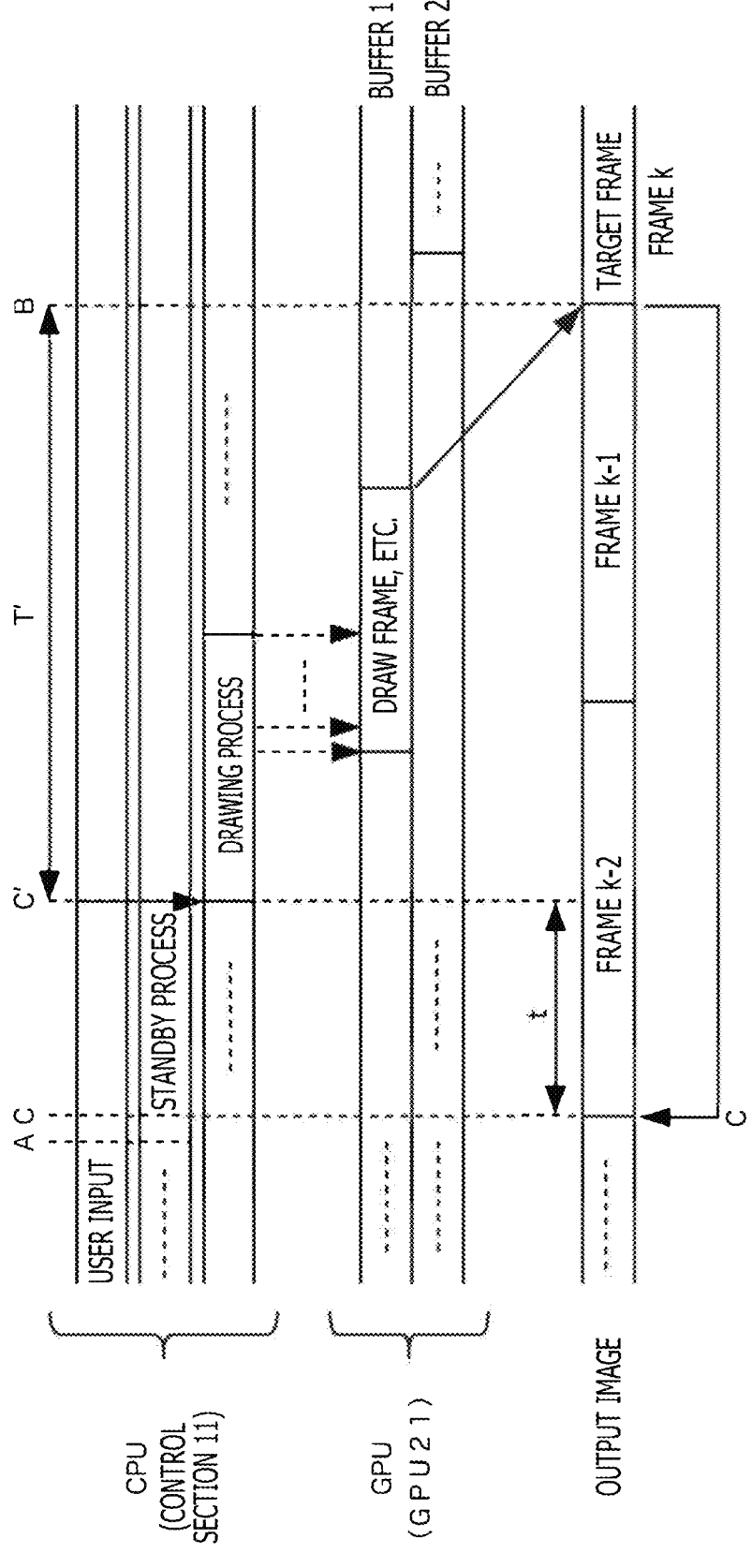
F I G . 5

F I G . 6
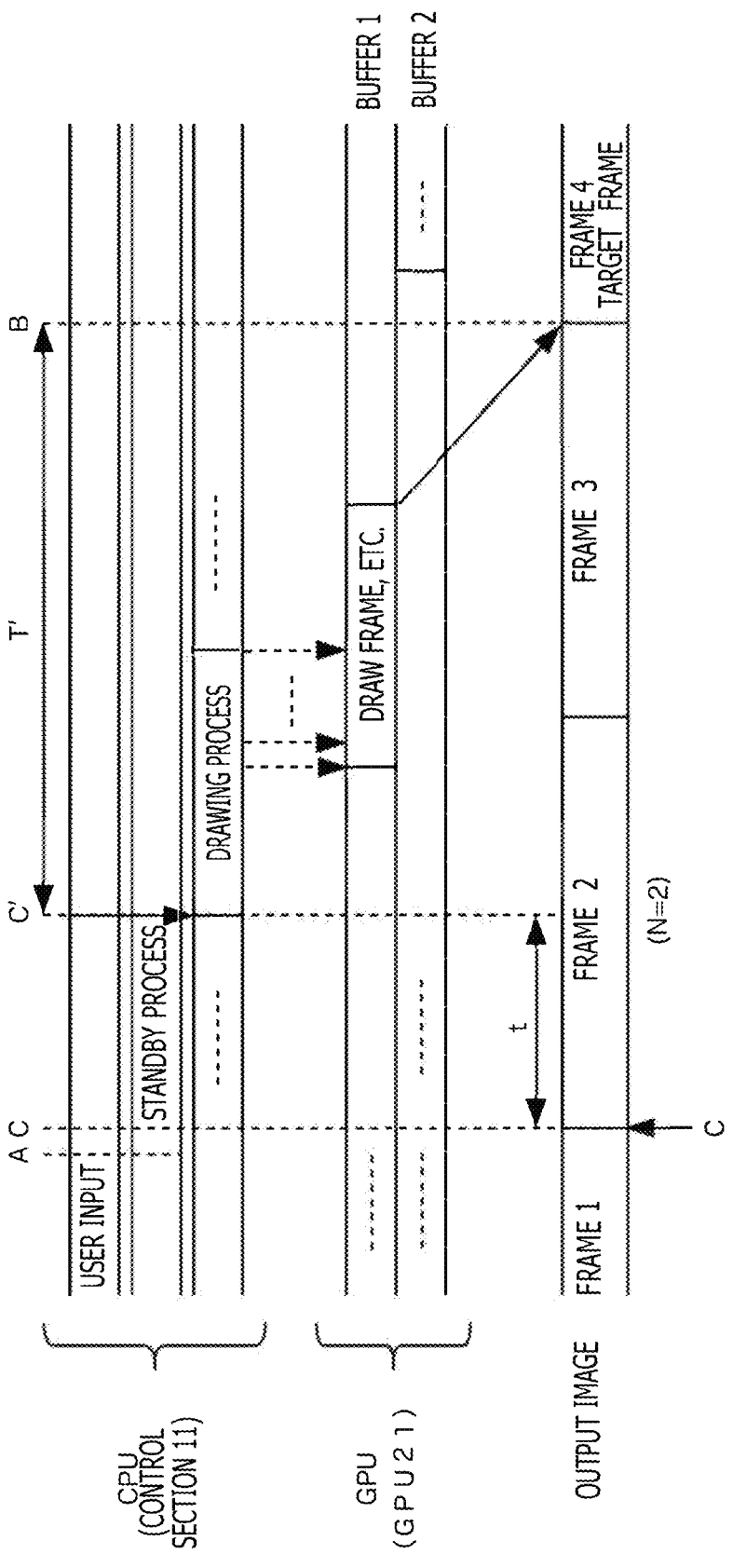

FIG. 8

FRAME RENDERING TIMING CONTROL

CROSS-REFERENCE TO RELATED APPLICATION

This application claims the benefit of Japanese Priority Patent Application JP 2023-029769 filed Feb. 28, 2023, the entire contents of which are incorporated herein by reference.

BACKGROUND

The present disclosure relates to an information processing apparatus, an information processing method, and a program.

Improvement of processing speeds of processors such as a central processing unit (CPU) and a graphics processing unit (GPU) in recent years has made it possible to draw animations in real time.

In such applications as games, for example, it is possible to repeatedly change a user character's viewpoint in a virtual game space and draw and output an image in the game space as seen from the changed viewpoint by means of manipulation input performed by the user.

Also, in such a case, it has become common to draw (buffer) a frame equivalent to a screen to be output for display before output and to output the frame for display at a predetermined timing after completion of the drawing.

SUMMARY

Under such circumstances, user input performed up to a point in time A when the drawing of a certain frame to be displayed in the future starts is accepted by the CPU, and the drawing process of the frame to be displayed in the future is performed in reference to the user input performed up to that time as illustrated in FIG. 8. In this CPU drawing process, the CPU issues a drawing instruction to the GPU, and the GPU performs the actual drawing of the frame image. The GPU retains (buffers) this frame until a certain timing B (flip timing) in the future and performs an output process (outputs an image) to an apparatus such as a display apparatus at the predetermined timing B.

Consequently, for the user, the display corresponding to the manipulation performed at the timing A is performed at timing B which is delayed by time T.

Such a delay is not preferable, for example, in applications that may require real-time processing such as game applications.

The present disclosure has been devised in light of the above actual circumstances, and it is desirable to provide an information processing apparatus, an information processing method, and a program capable of shortening such a delay between manipulation and drawing.

One mode of the present disclosure is an information processing apparatus that includes a processor, draws and buffers images frame by frame, and outputs the buffered frame every predetermined timing, and the processor performs a standby process of keeping a frame drawing process on standby until a specified timing and starts and controls the performance of the frame drawing process after the standby process.

According to an embodiment of the present disclosure, it is possible to shorten a delay between manipulation and drawing by accepting user input while a drawing process is kept on standby.

BRIEF DESCRIPTION OF THE DRAWINGS

FIG. 3 is an explanatory diagram illustrating an operation example of the information processing system according to the embodiment of the present disclosure;

FIG. 4 is an explanatory diagram illustrating another operation example of the information processing system according to the embodiment of the present disclosure;

FIG. 5 is an explanatory diagram illustrating still another operation example of the information processing system according to the embodiment of the present disclosure;

FIG. 6 is an explanatory diagram illustrating a different operation example of the information processing system according to the embodiment of the present disclosure;

FIG. 8 is an explanatory diagram illustrating a timing example of a drawing process in the related art.

DETAILED DESCRIPTION OF THE PREFERRED EMBODIMENT

Figure 1:
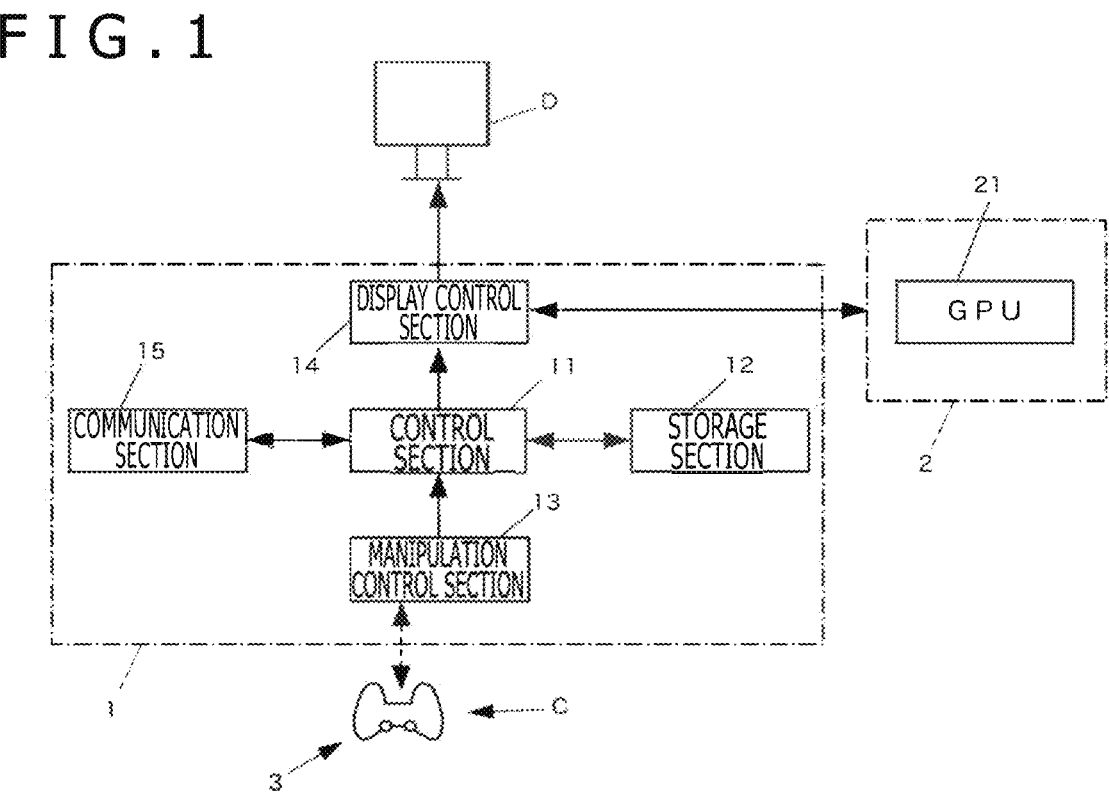
FIG. 1 is a block diagram illustrating a configuration example of an information processing system according to an embodiment of the present disclosure.

An embodiment of the present disclosure will be described with reference to drawings. An information processing apparatus 1 according to the embodiment of the present disclosure includes a control section 11 as a processor, a storage section 12, a manipulation control section 13, and a display control section 14 and, preferably, further includes a communication section 15 as illustrated in FIG. 1.

Also, a peripheral apparatus 2 including a GPU 21 which is a graphics processor may be connected to the display control section 14 of the information processing apparatus 1. It should be noted that the information processing apparatus 1 and the peripheral apparatus 2 may be integrally configured as an information processing system.

Further, a game controller C, a keyboard, a mouse, and any other manipulation apparatus 3 are connected in a wired or wireless manner to the information processing apparatus 1. Also, a display apparatus D is connected to the peripheral apparatus 2.

The control section 11 is a program-controlled device such as a CPU and realizes the processor according to an embodiment of the present disclosure. The control section 11 operates in accordance with the program stored in the storage section 12. In an example of the present embodiment, the control section 11 performs, in performing a frame drawing process, a standby process of keeping the frame drawing process on standby until a specified timing and starts and controls the performance of the frame drawing process after the standby process in question. The operation of the control section 11 will be described in detail later.

The storage section 12 is a memory device, a disk device, or any other device and retains a program executed by the control section 11. The program retained by the storage section 12 may be one which is provided in a manner stored in a computer-readable and non-transitory recording medium. The storage section 12 of the present embodiment also operates as a work memory of the control section 11.

The manipulation control section 13 accepts information indicating details of manipulation performed by the user from the manipulation apparatus 3 such as game controller. The manipulation control section 13 outputs the accepted information indicating the details of manipulation to the control section 11.

The display control section 14 accepts information such as a drawing instruction generated by the frame drawing process from the control section 11 and outputs the information such as a drawing instruction to the peripheral apparatus 2.

The GPU 21 of the peripheral apparatus 2 accepts the frame drawing instruction input from the control section 11, stores it in a command buffer, and draws a frame image in an image buffer in accordance with the retained drawing instruction when the drawing becomes possible. The GPU 21 also outputs the frame drawn in the image buffer to the display apparatus every predetermined timing (e.g., such a timing as a VSYNC timing of the display apparatus). In the example of the present embodiment, the GPU 21 has a pair of command buffers and a pair of image buffers (what is generally called a double buffer). Also, unique identification information (frame number) may be associated with each of the drawn frames and used by the control section 11 and the GPU 21.

An example of the manipulation apparatus 3 is the game controller C and accepts manipulation instructed by the user and outputs information indicating the details of manipulation performed by the user, in a wired or wireless manner to the information processing apparatus 1.

Figure 2:
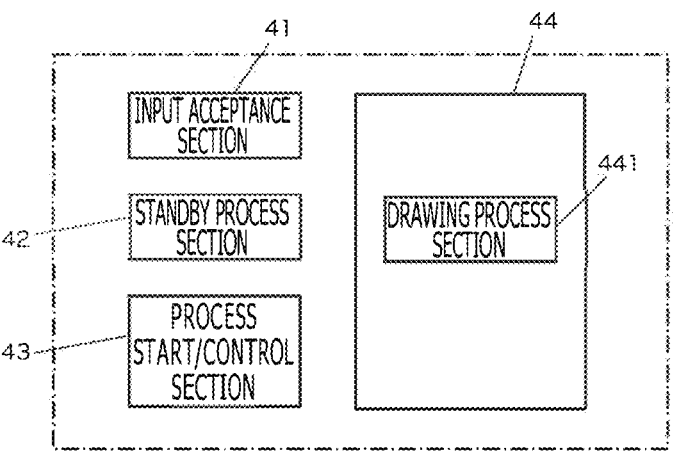
FIG. 2 is a functional block diagram illustrating an example of a control section of an information processing apparatus according to the embodiment of the present disclosure.

Next, an operation example of the control section 11 of the present embodiment will be described. The control section 11 of the present embodiment realizes a functional configuration including an input acceptance section 41, a standby process section 42, a process start/control section 43, and an application process section 44, as illustrated in FIG. 2, by executing the program retained in the storage section 12. Here, the application process section 44 functionally includes a drawing process section 441.

The input acceptance section 41 accepts manipulation information indicating the details of manipulation performed by the user on the manipulation apparatus 3, via the manipulation control section 13. The input acceptance section 41 buffers and retains the accepted manipulation information in the order of acceptance and outputs it to the application process section 44 in that order. The input acceptance section 41 also accepts manipulation information indicating the details of manipulation performed by the user (accepts user input) even while the standby process section 42 which will be described later keeps the drawing process by the application process section 44 on standby (during the standby process).

The standby process section 42 keeps the frame drawing process by the application process section 44 on standby until a specified timing (this timing will hereinafter be referred to as a drawing start timing for distinction). In the example of the present embodiment, the standby process section 42 may determine the above drawing start timing by a predetermined method based on a future timing (this timing will hereinafter be referred to as a reference timing for distinction) at which a frame to be output for display in the future (referred to as a target frame for convenience) is output for display (hereinafter referred to as to as flipped). It is assumed here that the target frame is a frame to be drawn in the future by the drawing process that is kept on standby by the standby process section 42, in reference to the drawing instruction generated by the drawing process section 441 of the application process section 44.

Specifically, the standby process section 42 accepts inputs of a frame count n (where n is an integer equal to or larger than 1) up to other frames Fr to be output ahead of a target frame Ft and an elapsed time from the timing when the other frames Fr are flipped (hereinafter referred to as an additional time) as information indicating conditions for ending the standby process from the application that performs this drawing process.

The standby process section 42 accepts information indicating the conditions and remains on standby until the specified timing comes. That is, as illustrated in FIG. 3, at the point in time A when the application starts to draw the target frame Ft to be displayed in the future, the standby process section 42 accepts, as information indicating the conditions for ending the standby process, the inputs of the frame count n up to the other frames Fr to be output ahead of the target frame Ft (hereinafter referred to as a designated frame count; n is an integer equal to or larger than 1) and the elapsed time (referred to as an additional time) t from the timing when the other frames Fr are flipped. In the example here, it is assumed that n=2 and the additional time t=1 millisecond.

The standby process section 42 of the control section 11 (CPU in FIG. 3) monitors a flip state of the frame by the GPU 21 and remains on standby until, of the other frames to be flipped earlier than the timing when the target frame Ft is flipped (point in time B in the future), the frame Fr preceding, by the designated frame count n=2, the target frame Ft is flipped.

When the frame Fr is flipped, the standby process section 42 remains on standby further for the additional time from that timing C (1 millisecond in the example here). Then, when a point in time C' comes after the lapse of the additional time, the standby process section 42 notifies the process start/control section 43 of the end of the standby process.

The process start/control section 43 instructs the drawing process section 441 of the application process section 44 to start the drawing of the target frame Ft that has been kept on standby. This causes the drawing process to be started and controlled from the point in time C'.

The application process section 44 performs the application program processes and performs, in the example here, the frame drawing process and other processes in reference to manipulation information indicating the details of manipulation performed by the user.

The application program to be executed by the application process section 44 may be any type of program such as a game program or a simulator.

When the drawing process of the preceding frame ends, the drawing process section 441 of the application process section 44 remains on standby until an instruction is accepted from the process start/control section 43 to the effect that the drawing of the next frame should be started. Then, when this instruction to the effect that the drawing of a frame should be started is accepted, the drawing process section 441 of the application process section 44 obtains information concerning manipulation performed by the user that has been accepted by the input acceptance section 41 by that point in time (point in time C' in the example here) and performs the drawing process by using the manipulation information.

The drawing process by the control section 11 here is in practice a process of generating a drawing instruction for the GPU 21, and the actual drawing of the frame by the GPU 21 is performed after this drawing process.

The GPU 21 of the peripheral apparatus 2 retains the drawing instruction input from the control section 11 which is the CPU in the command buffer and draws (buffers), if there is an image buffer whose image has not yet been displayed or is not currently displayed (if there is a free buffer), the frame image in the free buffer in question in accordance with the drawing instruction retained in the command buffer. Then, the buffered frame image is output (flipped) to the display apparatus or other apparatuses at a predetermined timing (e.g., next VSYNC timing).

It should be noted that this flip timing may be specified from the control section 11 of the information processing apparatus 1 or controlled on the side of the GPU 21.

[Operation]

The present embodiment basically includes the configuration described above and is operated as described below. In the example of the present embodiment, it is assumed that the information processing apparatus 1 of the information processing system is executing a game application and draws game spaces in response to user manipulation.

Also, this information processing system includes the peripheral apparatus 2 including the GPU 21, and the GPU performs drawing and display on the display apparatus by using a pair of command buffers and a pair of drawing buffers.

While the game application is executed, the information processing apparatus 1 repetitively draws and displays frames as described next. That is, the information processing apparatus 1 repetitively accepts manipulation information indicating the details of user manipulation on the manipulation apparatus 3 via the manipulation control section 13 as illustrated in FIG. 3.

Also, the information processing apparatus 1 gives an instruction on, as the game application process and at the timing when the drawing of the target frame Ft to be displayed in the future is started (point in time A), the designated frame count n (where n is an integer equal to or larger than 1) up to the other frames Fr to be output ahead of the target frame Ft and the additional time t from the timing when the other frames Fr are flipped, for the standby process that remains on standby for the drawing timing, as information indicating the conditions for ending the standby process.

In this instruction, the designated frame count n=2, and the additional time t=1 millisecond (display period of one frame which is, for example, shorter than the VSYNC period) in the example of FIG. 3.

As illustrated in FIG. 3, the information processing apparatus 1 performs the standby process as various services (API: Application Program Interface) performed on the application program, monitors the flip state of the frame by the GPU 21, and remains on standby until, of the other frames to be flipped earlier than the timing when the target frame Ft is flipped (point in time B in the future), the frame Fr preceding, by the designated frame count n=2, the target frame Ft is flipped.

In this standby process, when the frame Fr is flipped, the information processing apparatus 1 remains on standby further for the additional time (1 millisecond in the example here) from that timing C. Then, when the point in time C' comes after the lapse of the additional time, the information processing apparatus 1 instructs the application program processes to start the drawing of the target frame Ft that has been kept on standby.

The information processing apparatus 1 returns to the application program processes and performs the frame drawing process and other processes in reference to manipulation information indicating the details of manipulation accepted via the manipulation control section 13 by this point in time C'.

Although the image in the buffer to which the drawing has been performed is still displayed at this point in time C' as illustrated in the example of FIG. 3, it is possible for the CPU to generate a drawing instruction and for the GPU 21 to buffer the drawing instruction into the command buffer.

Thus, the information processing apparatus 1 starts the drawing process of the CPU from this point in time C' (the generation of a drawing instruction). This process is performed as the application program process and generates, in the example of the present embodiment here, an instruction of drawing an image in the game space, by using manipulation information that has been input from the user by the point in time C'. For example, movement of a user character provided in the game space is controlled by manipulation information that has been input from the user by this point in time C'.

The information processing apparatus 1 outputs the generated drawing instruction to the GPU 21. The GPU 21 retains the drawing instruction input from the information processing apparatus 1 in the command buffer and draws (buffers) the frame image in the image buffer that has been freed, in accordance with the drawing instruction retained in the command buffer at or after the timing when an image buffer whose image has not yet been displayed or is not currently displayed is generated (timing when the frame immediately preceding the target frame is flipped). Then, the buffered frame image is output to the display apparatus or other apparatuses at the next VSYNC timing (B).

Figure 8:
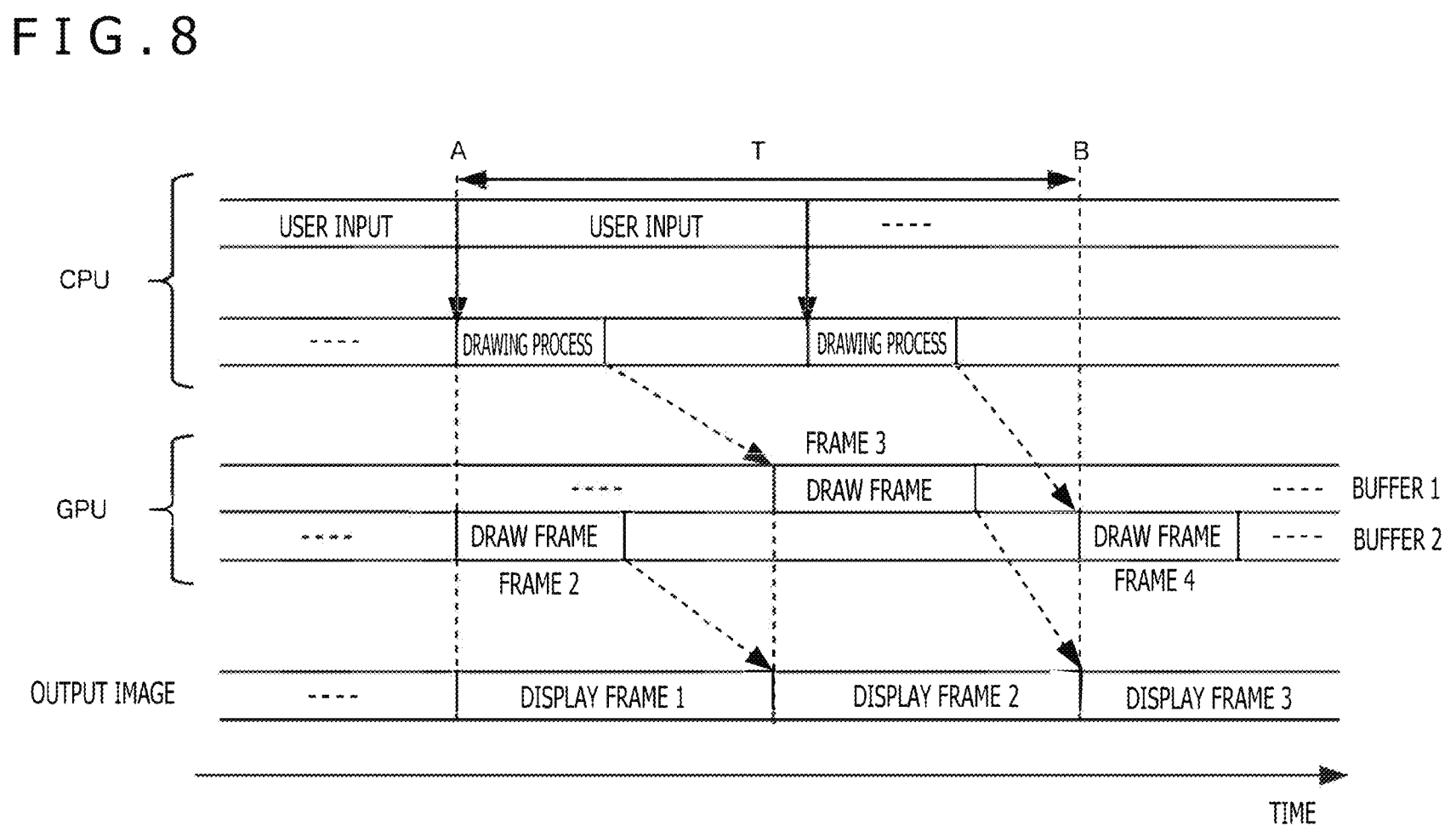

According to this example, as compared to a time T between the point in time A and the point in time B in the example of the related art illustrated in FIG. 8, a corresponding time T' is shortened, and the details of manipulation performed relatively recently by the user are reflected in the image flipped at the point in time B. Thus, according to the present embodiment, it is possible to shorten the delay between manipulation and drawing.

[Case in which the Frame Drawing Requires a Relatively Long Time]

Figure 4:
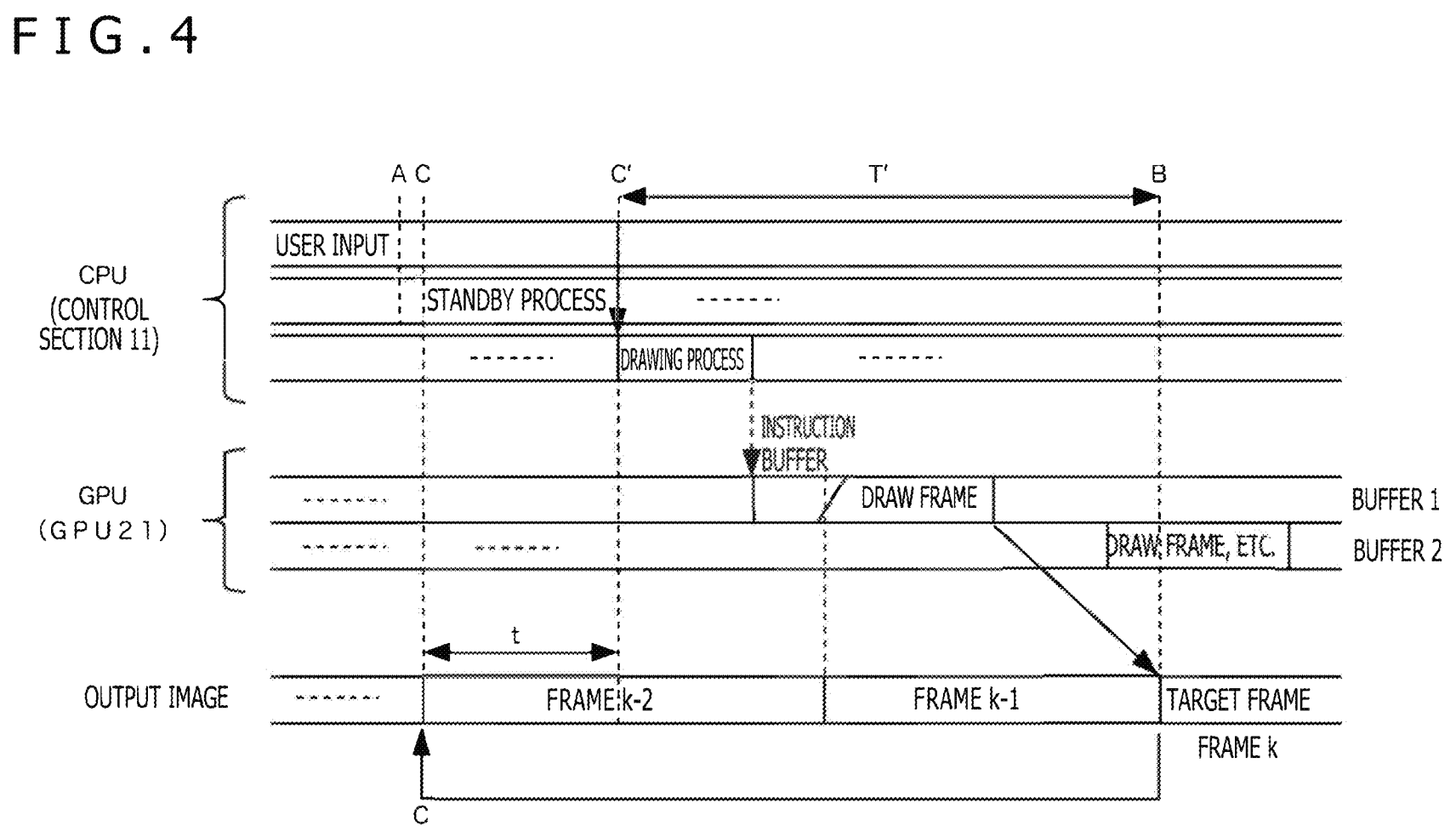

It should be noted that, in the example of FIG. 3, the time required for the GPU 21 to draw a frame is sufficiently shorter than the display period of the frame image. However, in the case where the time required for the GPU 21 to draw a frame is longer than this, the designated frame count n is increased, or the additional time t is shortened. Then, of the frames drawn by the GPU 21, loading of the drawing instruction into the command buffer from the GPU 21 is performed before the drawing buffer to which the drawing is performed is freed (FIG. 4).

In this example, the period from the completion of the loading of the drawing instruction to the freeing of the drawing buffer is a stall (a state in which nothing is performed). Thus, the designated frame count n and the additional time t are determined such that this stall period is as short as possible (0 if possible) and that the drawing to the drawing buffer is completed before the flip of the target frame drawn to the drawing buffer in question. Such setting of the designated frame count n and the additional time t can be performed experimentally, and the developer of the application program may design the program, for example, such that the designated frame count and the additional time are set in the application program processes adaptively in response to the number of polygons to be displayed or other values.

[Timeout]

Further, the control section 11 of the information processing apparatus 1 may, during the standby process, suspend the standby process and start the performance of the drawing process when the timing to flip the frame which is the frame to be flipped ahead of the target frame to be output at the reference timing and which is the frame to be flipped earlier than the target frame by L (where L is an integer within the range of $1 \leq L < n$ and is determined in advance) comes.

In a still different example, the control section 11 of the information processing apparatus 1 may, in the standby process, suspend the standby process and start the performance of the drawing process at the point in time when a predetermined timeout time elapses from the start of that standby process. Such a case occurs in the case where the flip timing becomes unstable and so on.

[Conditions for Ending the Standby Process]

In the description given so far, the condition for ending the standby process has been set by a relative frame count (designated frame count) from the target frame which is a reference. However, the present embodiment is not limited thereto.

For example, the condition for ending this standby process may be determined by frame identification information. As a specific example, the ending conditions may be determined by a frame number (N) which is frame identification information and the additional time t from the timing when a frame FN having the frame number N is flipped. In this example, the control section 11 that performs the application program processes gives an instruction on the frame number (N) and the additional time t for the standby process that remains on standby for the drawing timing.

The control section 11 that performs the standby process accepts the frame number (N) and the additional time t, starts the standby process, monitors the flip state of the frame by the GPU 21, and remains on standby until the flip timing of the frame having the frame number N.

When the frame having the frame number N is flipped, the control section 11 of the information processing apparatus 1 remains on standby further for the additional time t from that timing in this standby process. Then, when the point in time after the lapse of the additional time t in question comes, the control section 11 instructs the application program processes to start the drawing of the target frame that has been kept on standby.

The information processing apparatus 1 returns to the application program processes and performs the frame drawing process and other processes in reference to manipulation information indicating the details of manipulation accepted via the manipulation control section 13 by the timing when the start of this drawing is instructed.

[Inquiry to the GPU]

The control section 11 of the information processing apparatus 1 may inquire the GPU 21 of the peripheral apparatus 2 about a status of the process every predetermined inquiry timing. Specifically, in the case where the image flip timing is not controlled by the control section 11, for example, the control section 11 inquires the GPU 21 about identification information of the frame that has been flipped most recently.

In this example, the GPU 21 responds to the inquiry from the control section 11 and outputs the identification information of the most recently flipped frame to the control section 11. The control section 11 refers to this identification information accepted as a response to the inquiry and waits for the additional time t from the flip timing of the frame in question to end the standby process and start and control the performance of the drawing process, when the frame identified by the identification information is equivalent to the frame identified by the relative designated frame count from the target frame or when the frame identified by the identification information is equivalent to the frame designated by the frame number (N).

[Parallel Operation of the CPU and the GPU]

Further, the drawing process (generation of the drawing instruction) by the control section 11 and the drawing process (accumulation of the drawing instruction and actual frame drawing process) by the GPU 21 may be performed in parallel. In this case, the drawing process by the GPU 21 is started before the drawing process of the control section 11 ends (FIG. 5). FIG. 5 illustrates an example in which the relative designated frame count n from the target frame=1. As described above, it is possible to shorten the period from the user manipulation to the display of the corresponding image by operating the control section 11 and the GPU 21 in parallel during a single frame display period without lowering the performance.

This operation is similar in the case where the conditions for ending the standby process are designated by the frame number (N) (FIG. 6). FIG. 6 illustrates an example in which the frame number N=2.

Example of Triple Buffer

Further, the number of command buffers and that of drawing buffers are not limited to two (double buffer), and there may be three buffers (triple buffer) or more. In this case, the delay in display timing corresponding to the user manipulation is larger than that in the example of the double buffer if the above standby process of the present embodiment is not performed.

Figure 7A:
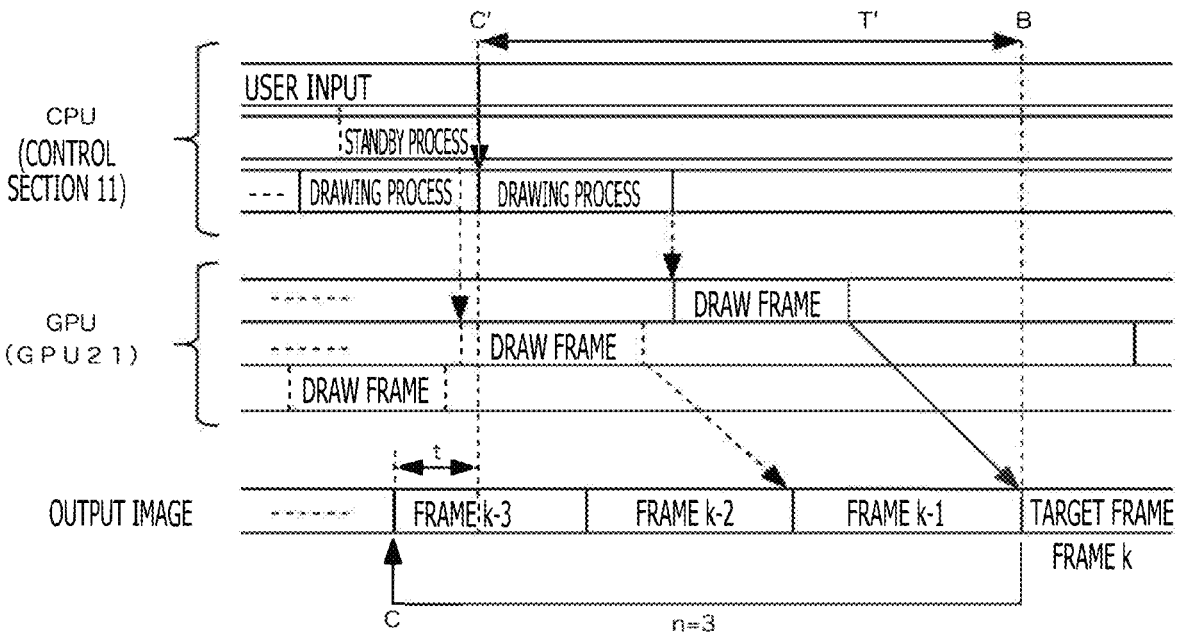
FIGS. 7A and 7B are explanatory diagrams illustrating a still different operation example of the information processing system according to the embodiment of the present disclosure.

Meanwhile, if the standby process is performed, for example, up to the point in time subsequent to, by the additional time t, the flip of the frame preceding, by n=3, the target frame, a delay T' of the timing when the display corresponding to the user manipulation is performed is relatively shortened as illustrated in FIG. 7A. Nevertheless, in this case, an advantageous effect of the triple buffer is reduced.

Figure 7B:
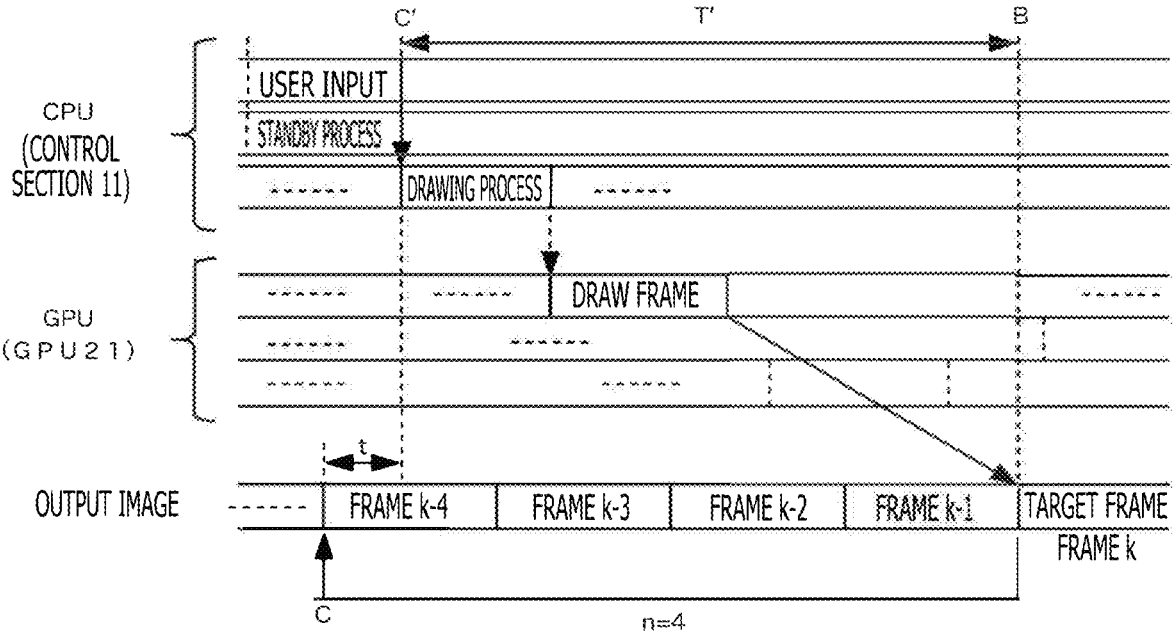

In such an example, in the application program processes, the designated frame count n or the frame number N and the additional time t are adaptively adjusted, for example, according to a game scene. This makes it possible to control whether to shorten the timing delay T' by relatively reducing the designated frame count n even if the advantageous effect of the triple buffer is reduced as in the example of FIG. 7A or to secure the number of drawing buffer count (which makes it possible to extend the time to be spent on the drawing process) by relatively increasing the designated frame count n (n=4 in FIG. 7B) even if the timing delay T' is increased as illustrated in FIG. 7B.

The former is effective in a setting where a delay in display from manipulation in a fighting scene and so on is crucial, and the latter is effective in a setting where how detailed the display content is more crucial than the delay in display from manipulation.

[Manipulation Acceptance Process]

It should be noted that, in the description given so far, the process of accepting manipulation information by the control section 11 may be performed by a thread different from that of the drawing process (parallel processes) or performed by the same thread as that of the drawing process. Which of the two is to be chosen may be selected by the application program or determined according to the conditions of hardware that performs the process.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
one or more processors configured to:
    receive a frame count from a frame to be output at a reference timing to another frame to be output ahead of the frame;
    hold generating a drawing instruction of a target frame based on the frame count; and
    start generating the drawing instruction of the target frame causing drawing the target frame.

2. The information processing apparatus according to claim 1,
    wherein the information processing apparatus is connected to a peripheral apparatus including a graphics processor,
    wherein the one or more processors are configured to generate and provide the drawing instruction to the graphics processor, and
    wherein the graphics processor is configured to draw the target frame in accordance with the drawing instruction.

3. The information processing apparatus according to claim 2,
    wherein the one or more processors are configured to determine a standby period for holding the generation of the drawing instruction of the target frame with reference to when the target frame is output.

4. The information processing apparatus according to claim 2, wherein
    the one or more processors are configured to inquire the graphics processor a status of the process every predetermined inquiry cycle.

5. The information processing apparatus according to claim 1, wherein the one or more processors are further configured to:
    receive a predetermined time; and
    hold generating
        the drawing instruction of the target frame to a graphic processor until the predetermined time elapses from when the graphic processor outputs another frame preceding the target frame by the frame count.

6. The information processing apparatus according to claim 5, wherein
    the frame count is an integer equal to or larger than 2, and,
    when the graphic processor outputs the other frame by a predetermined count smaller than the frame count while the one or more processors are holding generating the drawing instruction of the target frame, the one or more processors are configured to generate the drawing instruction of the target frame.

7. The information processing apparatus according to claim 1, wherein,
    when a predetermined timeout time elapses from when the one or more processors started holding generating the drawing instruction of the target frame, the one or more processors are configured to generate the drawing instruction of the target frame.

8. The information processing apparatus according to claim 1, wherein
    the one or more processors are further configured to:
        accept an input while holding generation of the drawing instruction, and
        causes generation of the drawing instruction based on the accepted input.

9. An information processing apparatus comprising:
one or more processors configured to generate a drawing instruction of a frame; and
a graphics processor configured to draw the frame based on the drawing instruction, wherein the one or more processors are configured to:
    receive a frame count from a frame to be output at a reference timing to another frame to be output ahead of the frame;
    hold generating a drawing instruction of a target frame to the graphic processor based on the frame count; and
    start generating the drawing instruction of the target frame causing drawing the target frame.

10. The information processing apparatus of claim 9, wherein the one or more processors are further configured to:
    receive a predetermined time,
    wherein hold generating the drawing instruction of the target frame to the graphic processor until the predetermined time elapses from when the graphic processor outputs another frame preceding the target frame by the frame count.

11. The information processing apparatus of claim 10, wherein
    the frame count is an integer equal to or larger than 2, and,
    when the graphic processor outputs the other frame by a predetermined count smaller than the frame count while the one or more processors are holding generating the drawing instruction of the target frame, the one or more processors are configured to generate the drawing instruction of the target frame.

12. The information processing apparatus of claim 9, wherein,
    when a predetermined timeout time elapses from when the one or more processors started holding generating the drawing instruction of the target frame, the one or more processors are configured to generate the drawing instruction of the target frame.

13. A method comprising:
receiving a frame count from a frame to be output at a reference timing to another frame to be output ahead of the frame;
holding generation of a drawing instruction of a target frame based on the frame count; and
generating the drawing instruction of the target frame causing drawing the target frame.

14. The method of claim 13, further comprising:
receiving a predetermined time; and
holding generation of the drawing instruction of the target frame to a graphic processor until the predetermined time elapses from when the graphic processor outputs another frame preceding the target frame by the frame count.

15. The method of claim 14, wherein
    the frame count is an integer equal to or larger than 2, and,
    wherein generating the drawing instruction of the target frame is executed when the graphic processor outputs the other frame by a predetermined count smaller than the frame count while holding generation of the drawing instruction of the target frame.

16. The method of claim 13, wherein,
wherein generating the drawing instruction of the target frame is executed when a predetermined timeout time elapses since holding generating the drawing instruction of the target frame is started.

17. A non-transitory, computer readable storage medium containing a program, which when executed by a processor, causes the processor to perform a method by carrying out actions, comprising:
by a processor,
receiving a frame count from a frame to be output at a reference timing to another frame to be output ahead of the frame;
holding generation of a drawing instruction of a target frame based on the frame count; and
generating the drawing instruction of the target frame causing drawing the target frame.

18. The non-transitory, computer readable storage medium of claim 17, which when executed by a processor, causes the processor to perform a method by carrying out actions, further comprising:
receiving a predetermined time; and
holding generation of the drawing instruction of the target frame to a graphic processor until the predetermined time elapses from when the graphic processor outputs another frame preceding the target frame by the frame count.

19. The non-transitory, computer readable storage medium of claim 18, wherein
the frame count is an integer equal to or larger than 2, and,
wherein generating the drawing instruction of the target frame is executed when the graphic processor outputs the other frame by a predetermined count smaller than the frame count while holding generation of the drawing instruction of the target frame.

\* \* \* \* \*